United States Patent
Boutaghou et al.

[11] Patent Number: 6,055,127
[45] Date of Patent: Apr. 25, 2000

[54] DISC HEAD SLIDER HAVING SURFACE DISCONTINUITIES TO MINIMIZE FLY STICTION

[75] Inventors: Zine-Eddine Boutaghou, Vadnais Heights, Minn.; Jih-Ping Peng, San Jose, Calif.

[73] Assignee: Seagate Technology, Inc., Scotts Valley, Calif.

[21] Appl. No.: 08/809,631

[22] PCT Filed: Jan. 13, 1997

[86] PCT No.: PCT/US97/00346

§ 371 Date: Mar. 27, 1997

§ 102(e) Date: Mar. 27, 1997

[87] PCT Pub. No.: WO98/21716

PCT Pub. Date: May 22, 1998

Related U.S. Application Data

[60] Provisional application No. 60/030,687, Nov. 13, 1996.

[51] Int. Cl.[7] .............................. G11B 5/60; G11B 21/21
[52] U.S. Cl. ........................................................... 360/103
[58] Field of Search ................................. 360/103, 97.02

[56] References Cited

U.S. PATENT DOCUMENTS

| | | | |
|---|---|---|---|
| 4,212,044 | 7/1980 | Plotto | 360/103 |
| 4,553,184 | 11/1985 | Ogishima | 360/103 |
| 4,636,894 | 1/1987 | Mo | 360/103 |
| 4,646,180 | 2/1987 | Ohtsubo | 360/103 |
| 4,673,996 | 6/1987 | White | 360/103 |
| 4,894,740 | 1/1990 | Chhabra et al. | 360/103 |
| 4,961,121 | 10/1990 | Astheimer et al. | 360/103 |
| 5,062,017 | 10/1991 | Strom et al. | 360/103 |
| 5,200,868 | 4/1993 | Chapin et al. | 360/103 |
| 5,386,400 | 1/1995 | Nakayama et al. | 360/103 X |
| 5,388,017 | 2/1995 | Franco et al. | 360/103 |
| 5,515,219 | 5/1996 | Ihrke et al. | 360/103 |

FOREIGN PATENT DOCUMENTS

| | | | |
|---|---|---|---|
| 58-88872 | 5/1983 | Japan | 360/103 |
| 61-148685 | 7/1986 | Japan . | |
| 61-160885 | 7/1986 | Japan . | |
| 61-204877 | 9/1986 | Japan . | |
| 63-231775 | 9/1988 | Japan . | |
| 1-116957 | 5/1989 | Japan . | |
| 1-227215 | 9/1989 | Japan . | |
| 2-162584 | 6/1990 | Japan . | |

*Primary Examiner*—William R. Korzuch
*Attorney, Agent, or Firm*—Westman, Champlin & Kelly, P.A.

[57] ABSTRACT

A slider supports a transducer proximate to a lubricated recording medium. The slider includes a slider body, a raised rail formed on the slider body and a fluid flow pattern across the slider body which has at least one stagnant flow region. A surface discontinuity is formed on the slider body and is positioned within the stagnant flow region to inhibit lubrication collected within the stagnant flow region from migrating to the raised rail.

29 Claims, 7 Drawing Sheets

DISC HEAD SLIDER HAVING SURFACE DISCONTINUITIES TO MINIMIZE FLY STICTION

This application is a 371 of application Ser. No. PCT/US97/00346, filed Jan. 13, 1997, which claims the benefit of U.S. Provisional Application Ser. No. 60/030,687, filed Nov. 13, 1996.

BACKGROUND OF THE INVENTION

The present invention relates to disc drive data storage devices and, more particularly to a disc drive having a slider with surface discontinuities for preventing migration of disc lubrication or contaminants to the air bearing surfaces.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective head gimbal assemblies (HGAs). HGAs carry transducers which write information to and read information from the disc surface. An actuator mechanism moves the head gimbal assemblies from track to track across the surfaces of the discs under control of electronic circuitry. The actuator mechanism includes a track accessing arm and a suspension for each head gimbal assembly. The suspension provides a preload force which urges the head gimbal assembly toward the disc surface.

The head gimbal assembly includes a hydrodynamic (e.g. self generatic air) bearing the slider and a gimbal. The gimbal is positioned between the suspension and the slider to provide a resilient connection that allows the slider to pitch and roll while following the topography of the disc. Alternatively, the gimbal has been integrated within the suspension.

A conventional catamaran slider includes a pair of raised side rails which face the disc surface and form air bearing surfaces. As the disc rotates, the disc drags air under the slider along the air bearing surfaces in a direction approximately parallel to the tangential velocity of the disc. As the air passes beneath the side rails, skin friction on the air bearing surfaces causes the air pressure between the disc and the air bearing surfaces to increase which creates a hydrodynamic lifting force that causes the slider to lift and fly above the disc surface. The preload force supplied by the suspension counteracts the hydrodynamic lifting force. The preload force and the hydrodynamic lifting force reach an equilibrium based upon the hydrodynamic properties of the slider and the speed of rotation of the disc. A self-loading slider further includes a cross rail which extends between the side rails. Air passing over the cross rail expands creating a subambient pressure area which forces the slider closer to the disc surface.

A typical magnetic disc is coated with a thin layer of perfluoronated lubricant for reducing wear at the head and disc interface. While most of the lubricant remains bonded to the surface of the disc, a small portion of the lubricant remains free and tends to collect on the slider surface. When the disc stops rotating and the slider rests on the disc surface, it has been observed in the development of the present invention that the collected lubricant tends to migrate to the air bearing surfaces where the collected lubricant tends to pull the slider and the disc surface together by the action of meniscus surface tension. The force by which the slider and the disc surface are pulled together is known as "stiction".

The stiction force adversely affects contact start and stop (CSS) performance of the slider and may be high enough to prevent the spindle motor from rotating the disc.

One method of reducing the stiction and improving CSS performance is to lap a crown onto the air bearing surface by pressing the slider against a spherically shaped lapping plate. A crowned air bearing surface reduces collection of lubrication between the slider and the disc. However, more complete solutions to reducing stiction are desired.

SUMMARY OF THE INVENTION

The slider of the present invention supports a transducer proximate to a lubricated recording medium. The slider includes a slider body, at least one rail formed on the slider body and a fluid flow pattern across the slider body with at least one stagnant flow region. A surface discontinuity is formed on the slider body and is positioned within the stagnant flow region to inhibit lubrication collected within the stagnant flow region from migrating to the raised rail.

In one embodiment, the surface discontinuity includes one or more recesses within the slider body. Each recess can have a variety of shapes, such as an elongated trench or a plurality of spaced depressions. In another embodiment, the surface discontinuity includes one or more raised surface features on the slider body. Each raised surface feature can have a variety of shapes, such as an elongated ridge or a plurality of spaced apart bumps.

DETAILED DESCRIPTION OF THE PREFERRED EMBODIMENTS

Figure 1:
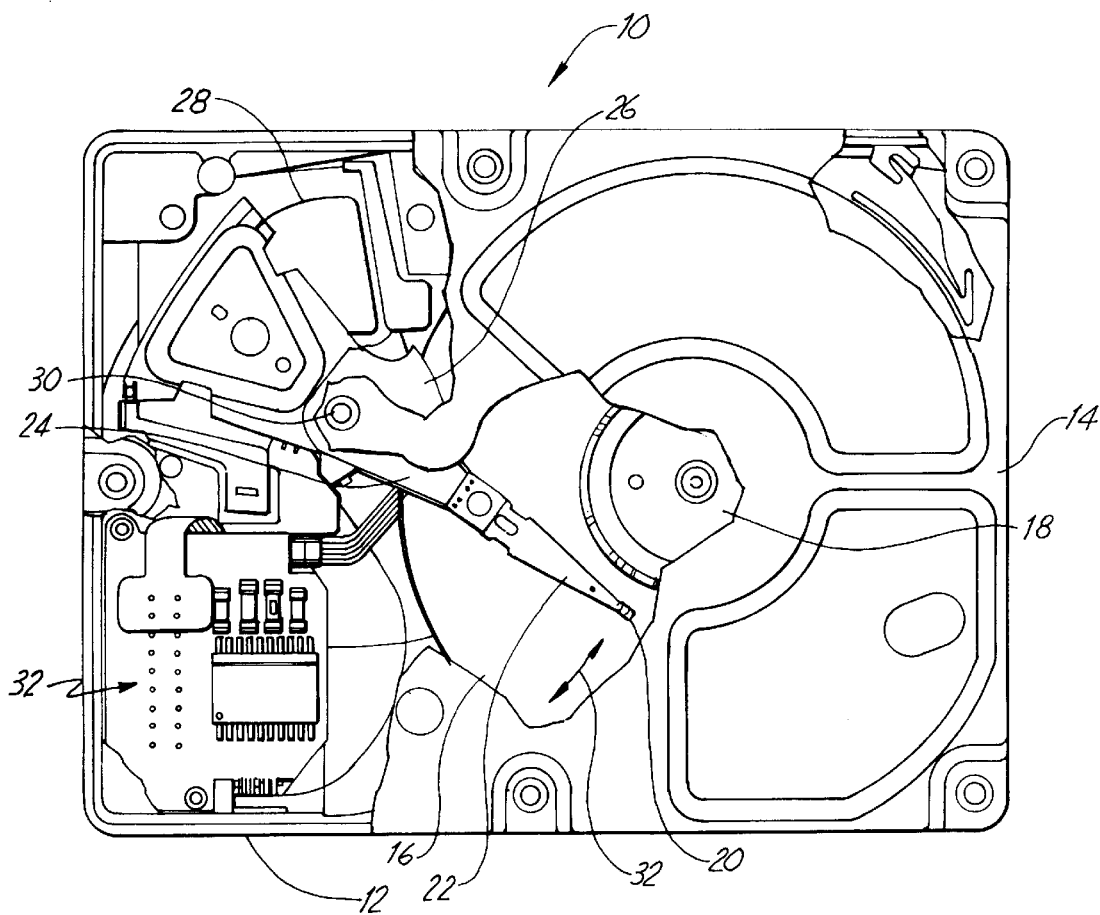
FIG. 1 is a top plan view of a disc drive data storage device in which the present invention is useful.

FIG. 1 is a plan view of a typical disc drive 10. Disc drive 10 includes a housing with a base 12 and a top cover 14 (portions of top cover 14 are removed for clarity). Disc drive 10 further includes a disc pack 16, which is mounted on a spindle motor (not shown) by a disc clamp 18. Disc pack 16 includes a plurality of individual discs which are mounted for co-rotation about a central axis. Each disc surface has an associated head gimbal assembly (HGA) 20 which is mounted to disc drive 10 for communication with the disc surface. In the example shown in FIG. 1, HGAs 20 are supported by load beam flexures 22 which are in turn attached to track accessing arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached heads 20 about a pivot shaft 30 to position heads 20 over a desired data track along an arcuate path 32 under the control of electronic circuitry 33. Each HGA 20 includes a gimbal 34 and a slider 36.

Figure 2:
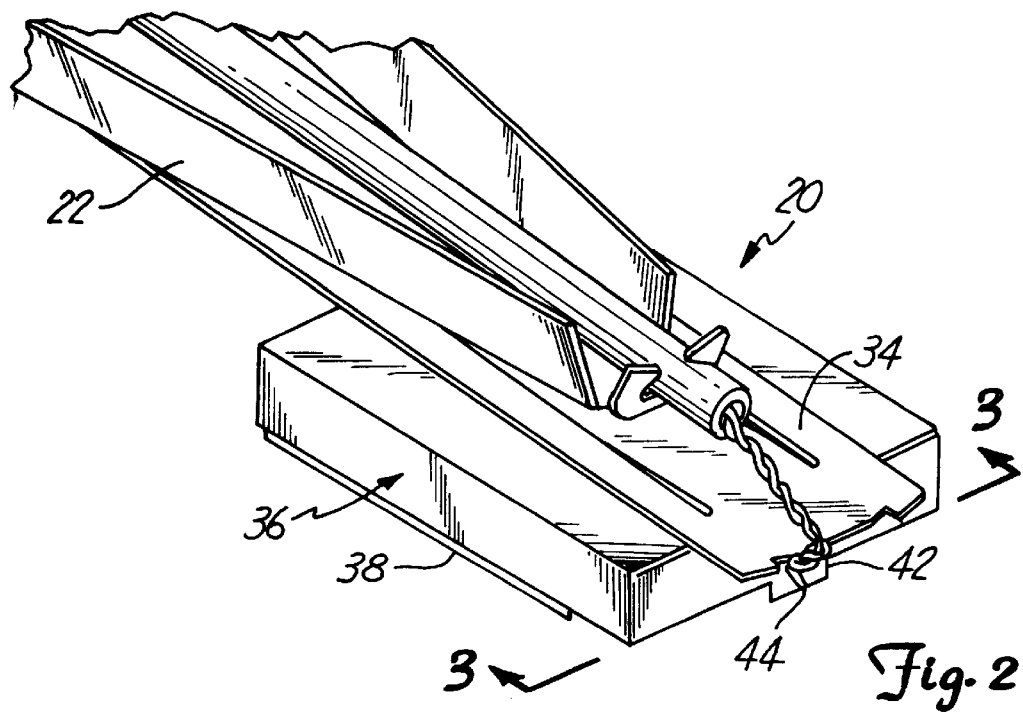
FIG. 2 is a perspective view of a head gimbal assembly supported by a load beam flexure.
Figure 3:
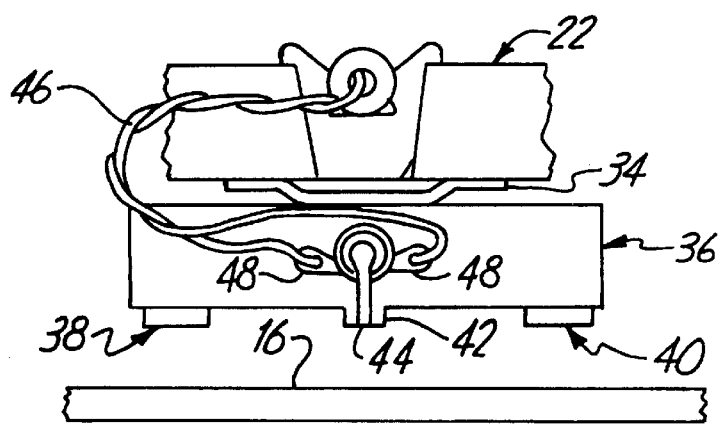
FIG. 3 is an end view of the head gimbal assembly taken along line 3—3 of FIG. 2.

FIGS. 2 and 3 show head gimbal assembly 20 in greater detail. FIG. 2 is a perspective view of head gimbal assembly 20 supported by load beam flexure 22. FIG. 3 is an end view of head gimbal assembly 20 taken along line 3—3 of FIG. 2. Load beam 22 supplies a preload force which urges head gimbal assembly 20 toward the disc surface. Assembly 20 includes a gimbal 34 and a slider 36. Gimbal 34 is positioned between slider 36 and load beam 22 to provide a resilient connection that allows the slider to follow the topography of the disc. In an alternative embodiment, gimbal 34 is integrated into load beam 22. Slider 36 is connected to gimbal 34 in a known manner, such as with an adhesive. Gimbal 34 includes a dimple (not shown) that is in point contact with slider 36. The dimple provides a pivot about which slider 36 can pitch and roll while following the topography of disc 16.

Slider 36 includes first and second side rails 38 and 40, center rail 42 and transducer 44. Transducer 44 is mounted to a trailing end of center rail 42. Transducer 44 is electrically coupled to leads 46 at bonding pads 48. Transducer 44 communicates with individual bit positions on the surface of disc 16 as they pass beneath slider 36. Transducer 44 can include a thin film or magnetoresistive magnetic head, for example. The number of conductors and bonding pads depends upon the number of conductors required for the particular head that is carried by slider 36.

Figure 4:
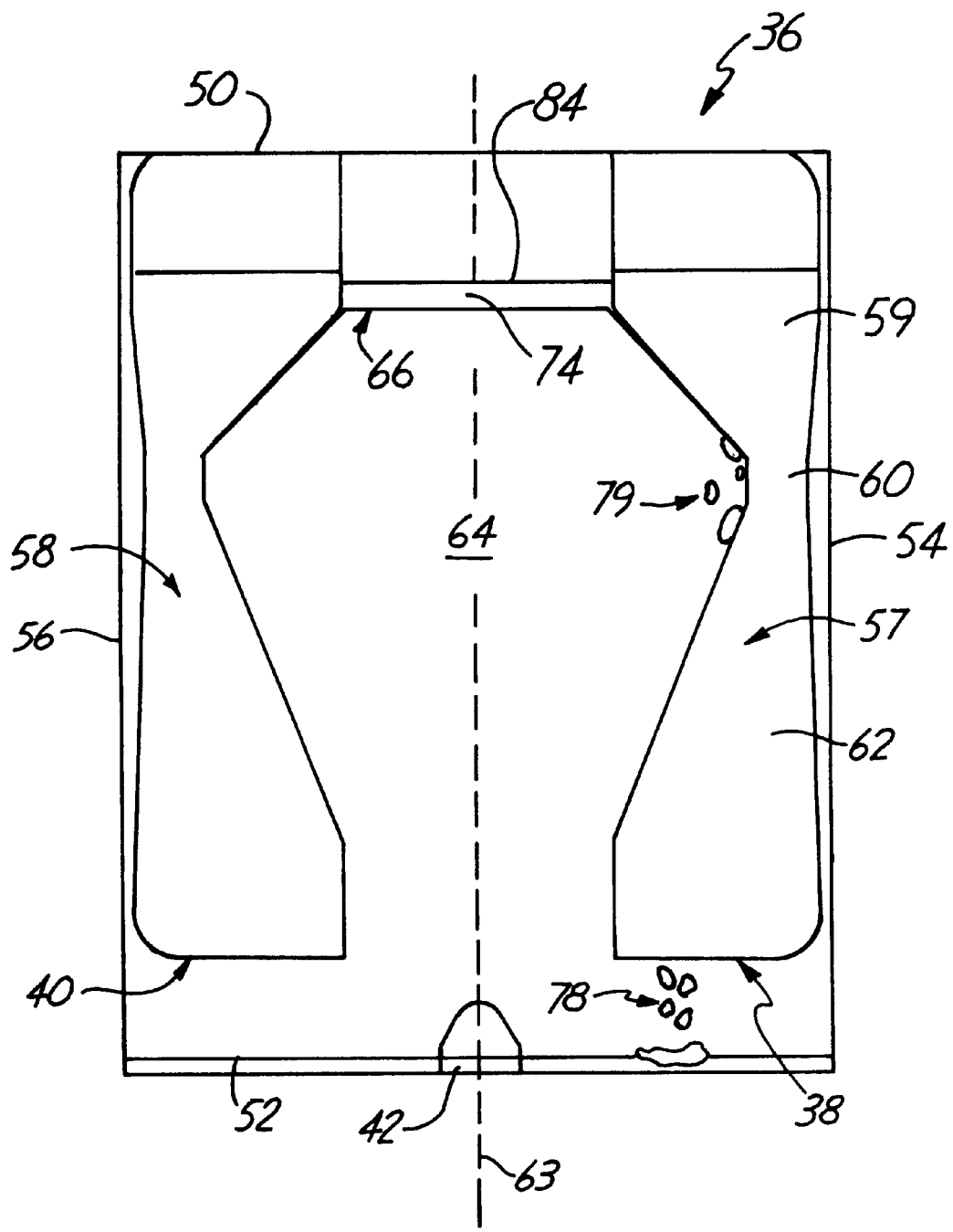
FIG. 4 is bottom plan view of slider which tends to collect droplets of disc lubricant.

FIG. 4 is bottom plan view of slider 36 as seen from the surface of disc 16. Slider 36 has a leading edge 50, a trailing edge 52 and first and second side edges 54 and 56. First and second side rails 38 and 40 extend from leading edge 50 toward trailing edge 52 and terminate prior to the trailing edge. First and second side rails 38 and 40 form bearing surfaces 57 and 58, respectively. Bearing surfaces 57 and 58 have a leading portion 59, a waist portion 60 and a trailing portion 62. Waist portion 60 is narrower than leading and trailing portions 59 and 62. A center rail or "island" 42 is positioned at trailing edge 52 and is centered along a longitudinal center line 63 of slider 36. A subambient pressure cavity 64 is positioned between first and second side rails 38 and 40. A cavity dam 66 extends from first side rail 38 to second side rail 40 and is recessed from bearing surfaces 57 and 58.

Figure 5:
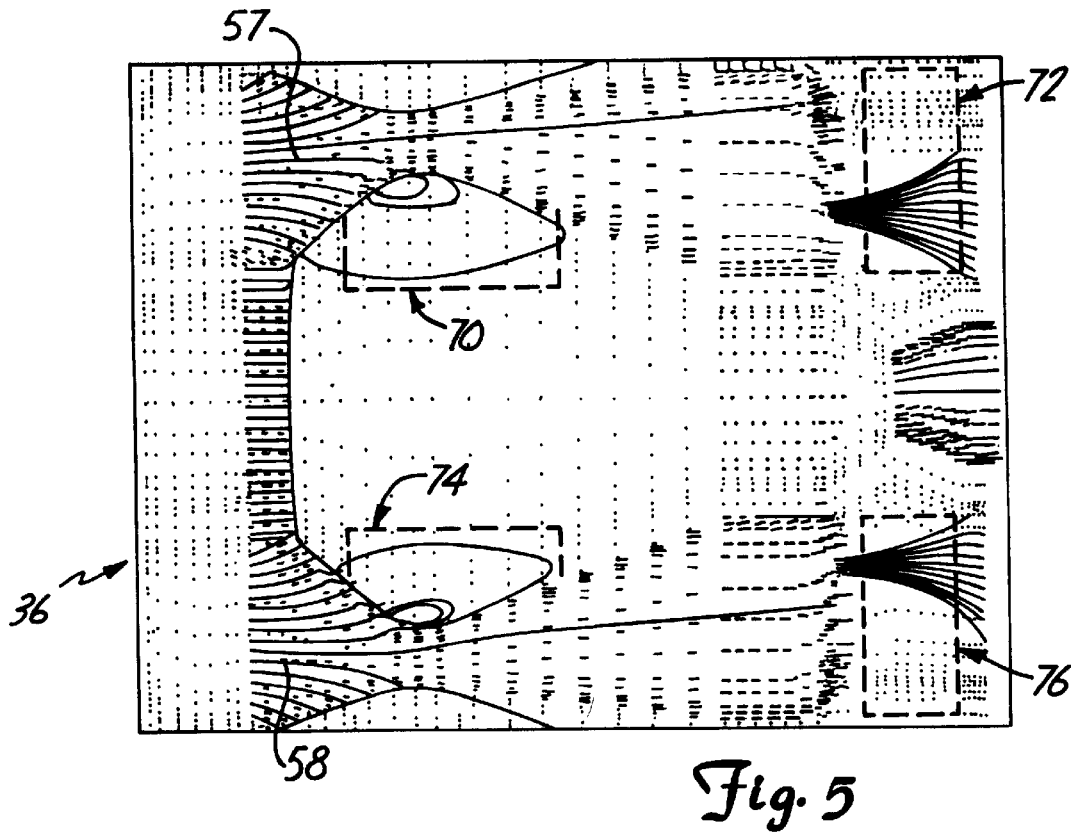
FIG. 5 is numerical model of the slider shown in FIG. 4 which illustrates the stream lines of air flow.

FIG. 5 is a numerical model of slider 36 which illustrates the stream lines of air flow across the surface of slider 36. As the disc rotates, the disc drags air under slider 36 and along bearing surfaces 57 and 58 in a direction generally parallel to the tangential velocity of the disc. Many of the current air bearing surface configurations develop air flow stagnation regions due to shallow subambient pressure cavities and upstream re-circulation of air flow in the cavity region. Slider 36 has stagnation regions 70, 72, 74 and 76 adjacent side rails 38 and 40. It is hypothesized that the air flow contains micro-droplets of free lubrication which likely follows the stream lines and redeposits in the air flow stagnation regions of the slider surface.

Referring back to FIG. 4, droplets of lubricant 78 and 79 are shown redeposited on the slider surface within the stagnant flow regions. Experiments have shown that after the disc has stopped rotating and the slider has rested on the disc surface for an extended period of time, the collected lubricant migrates toward side rails 38 and 40 and becomes entrained by capillary forces on the edges of the rails at the air bearing surfaces. The lubricant which migrates to the side rails causes fly stiction to occur. In accordance with the present invention, slider 36 is provided with surface discontinuities adjacent the rails and which trap the collected lubricant and inhibit the lubricant from migrating toward the rails. The surface discontinuities can include one or more recessed or raised surface features which are positioned where air flow stagnation regions are predicted to occur. The surface discontinuities can be formed by any process, such as ion milling, etching, laser treatment, scratching or cutting, for example. In a preferred embodiment, the surface discontinuities are integrated into an ion milling mask which forms the air bearing features so that a separate process step is not required to form the surface discontinuities.

Figure 6:
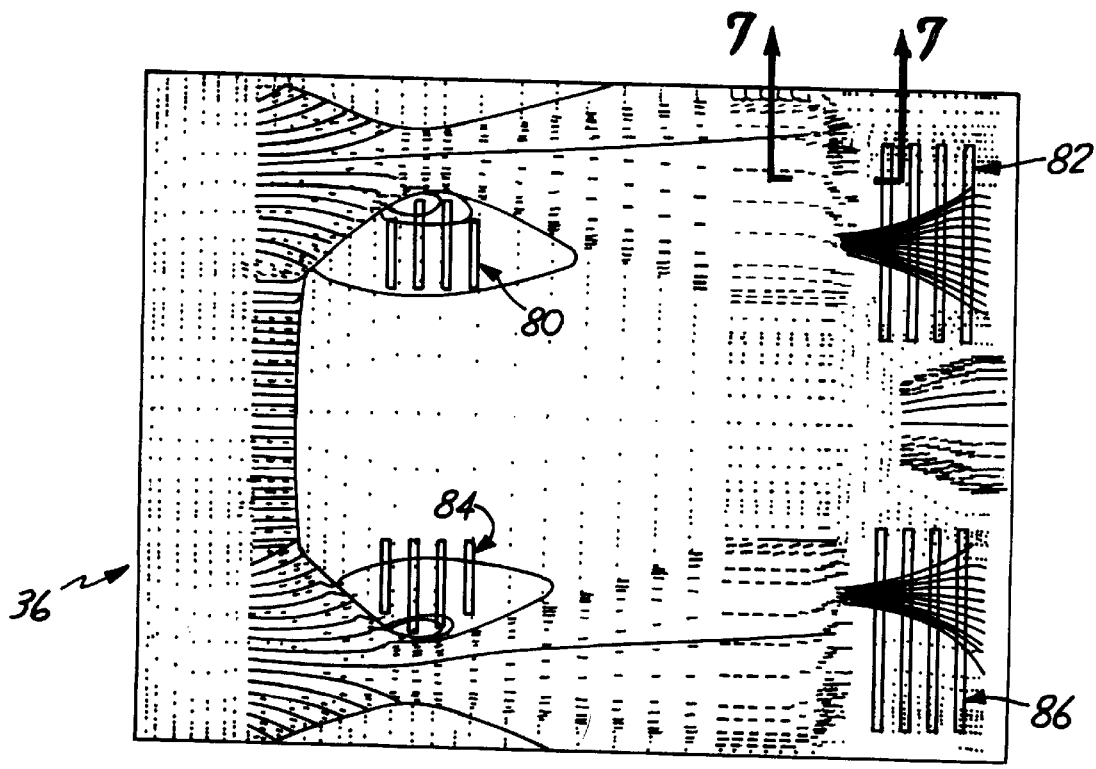
FIG. 6 is a diagram which illustrates rectangular trenches superimposed onto the numerical model shown in FIG. 5 according to the present invention.

FIG. 6 is a diagram which illustrates surface discontinuities superimposed onto the numerical model shown in FIG. 5. Four sets of horizontal, rectangular trenches 80, 82, 84 and 86 are formed in the body of slider 36 within stagnation regions 70, 72, 74 and 76, respectively. In this embodiment, the trenches are confined to the stagnation regions. The trenches preferably have a depth and width of 0.1–10 microns (0.004–0.4 mils), and most preferably have a depth and width of 1–2 microns (0.04–0.08 mils). The length and depth of each trench depends upon its position, the size of the stagnation region and the physical properties of the lubrication that is to be collected. For example, in alternative embodiments, each trench may be 10–20 microns (0.4–0.8 mils) wide or up to 100 microns (4 mils) wide.

Modeled test results show that trenches 80, 82, 84 and 86 have little effect on the air bearing flying performance of slider 36 since the trenches are positioned within the airflow stagnation regions. This suggests that existing air bearing surface configurations can be modified to add the surface discontinuities of the present invention without requiring the air bearing surface to be changed to accommodate the trenches. The lubricant was experimentally observed to form large droplets in the trenches due to the surface tension of the lubricant. After the disc stopped rotating and the slider remained at rest on the disc surface for an extended period of time, the droplets of lubricant remained trapped in the trenches and did not migrate to the rails. It is hypothesized that the droplets of lubricant had reached their minimum potential energy by matching the trench geometry.

Figure 7:
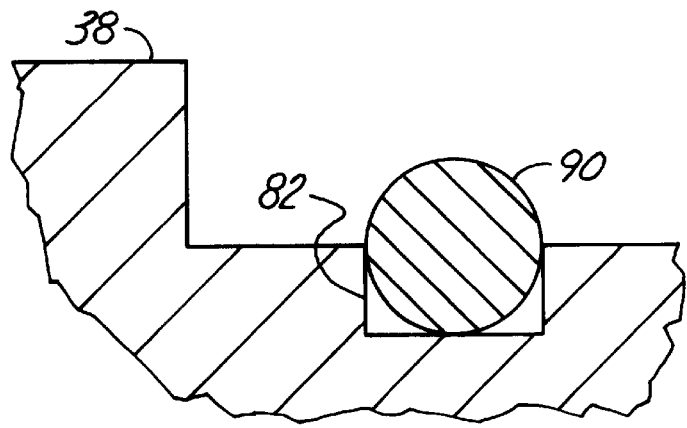
FIGS. 7–9 are fragmentary, sectional views of alternative trench geometries according to the present invention.

FIG. 7 is a fragmentary, sectional view of slider 36 taken along lines 7—7 of FIG. 6. Trench 82a has a rectangular cross section and is positioned adjacent the trailing edge of rail 38. Lubricant droplet 90 is trapped within trench 82a.

Figure 8:
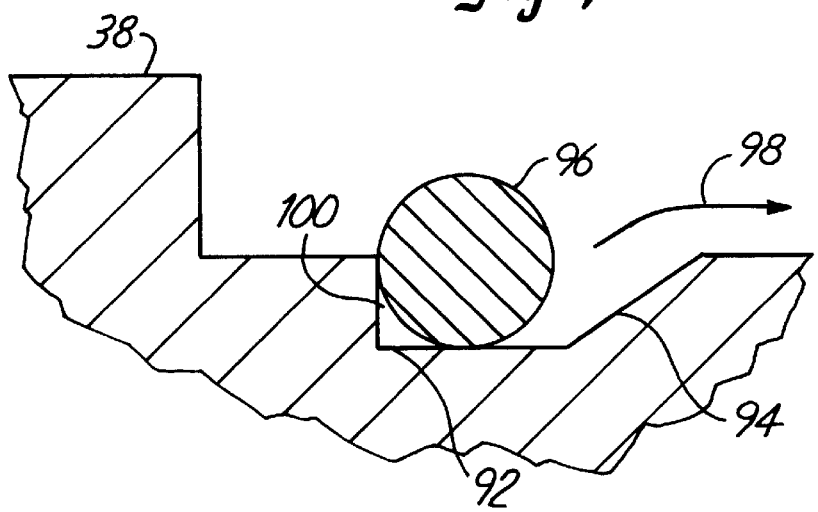

FIG. 8 is a fragmentary, sectional view of slider 36 which illustrates a trench 92 according to an alternative embodiment of the present invention. Trench 92 has an oblique side wall 94 opposite to the trailing edge of rail 38 which allows lubricant droplet 96 to circulate away from side rail 38 in the direction of arrow 98. Side wall 100 prevents migration of lubricant droplet 96 toward side rail 38.

Figure 9:
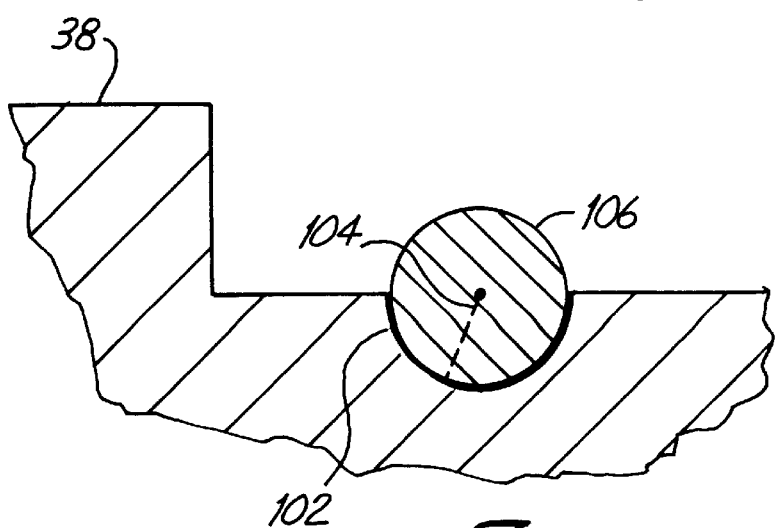

FIG. 9 illustrates another alternative trench geometry. In FIG. 9, trench 102 has a radius of curvature 104 which matches the contact angle of lubricant droplet 106. Matching the contact angle minimizes the potential energy of lubricant droplet 106. The trenches can also have various other rectangular and non-rectangular cross sections. These cross sections can be selected to optimize collection of particular lubricants or collection of contaminants or debris.

Figure 10:
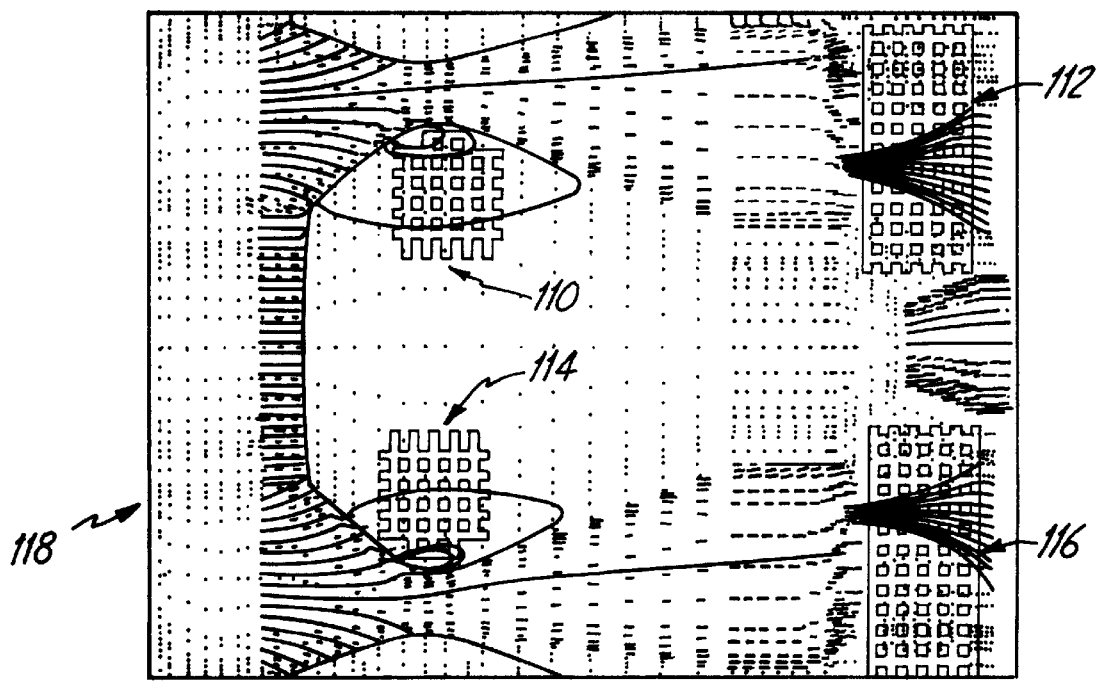
FIG. 10 is a bottom plan view of a cross-hatched trench configuration which is superimposed on the numerical model shown in FIG. 5.
Figure 11:
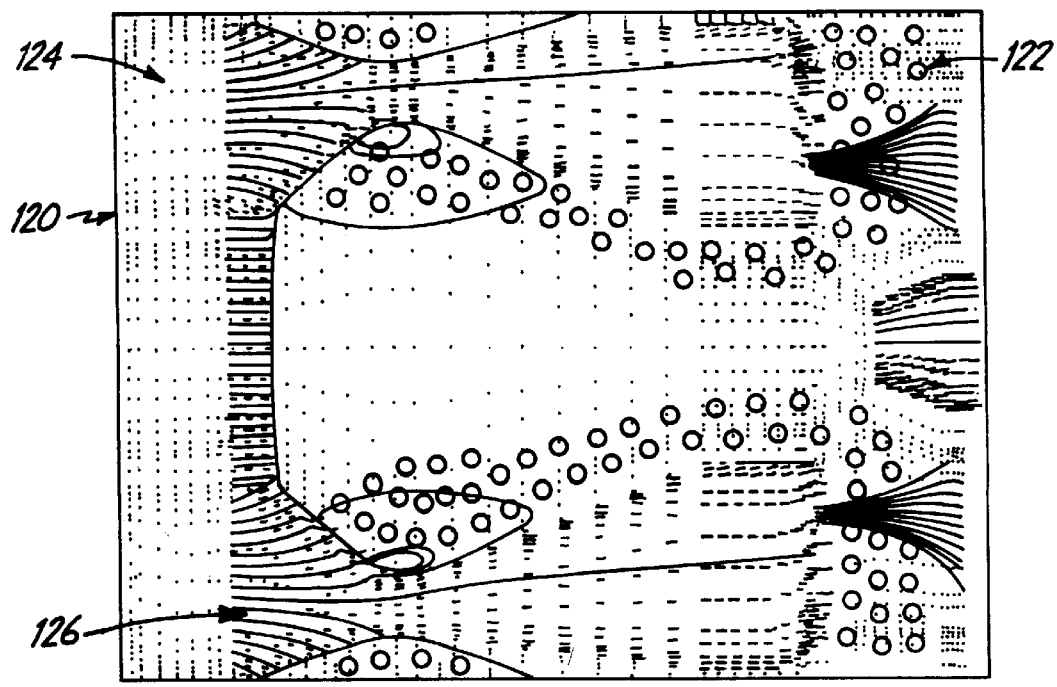
FIG. 11 is bottom plan view of a slider having a plurality of depressions which substantially surround the side rails.

FIG. 10 is a bottom plan view of a cross-hatched trench configuration in which the trenches are arranged to form lattices 110, 112, 114 and 116. Each lattice includes individual trenches extending in the longitudinal and transverse directions within the body of slider 118. In another alternative embodiment, trenches 110, 112, 114 and 116 are the inverse of that shown in FIG. 10. In this embodiment, each trench or surface discontinuity includes a square depression in the surface of slider 118. The square depressions can be arranged to form lattices similar to that shown in FIG. 10 or can have a random spacing. The depressions can also have other shapes, such as circular, oval or cross shapes, for example. FIG. 11 is bottom plan view of a slider 120 having a plurality of depressions 122 which substantially surround side rails 124 and 126 to minimize the possibility of lubricant migrating to the rails. In an alternative embodiment, a plurality of parallel or cross-hatched trenches surround the rails. The depressions or trenches can also have curvilinear shapes which match the air flow characteristics of the slider.

In yet an another alternative embodiment of the present invention, the surface discontinuities include raised surface features on the slider body instead of depressions in the slider body. The raised surface features can include elongated horizontal ridges, similar to the horizontal trenches shown in FIG. 6, cross-hatched ridges similar to the cross-hatched trenches shown in FIG. 10 or individual bumps similar to the depressions shown in FIG. 11. Each ridge or bump can have a variety of cross sections such as rectangular, square, circular, oval or cross shaped, for example.

Figure 12:
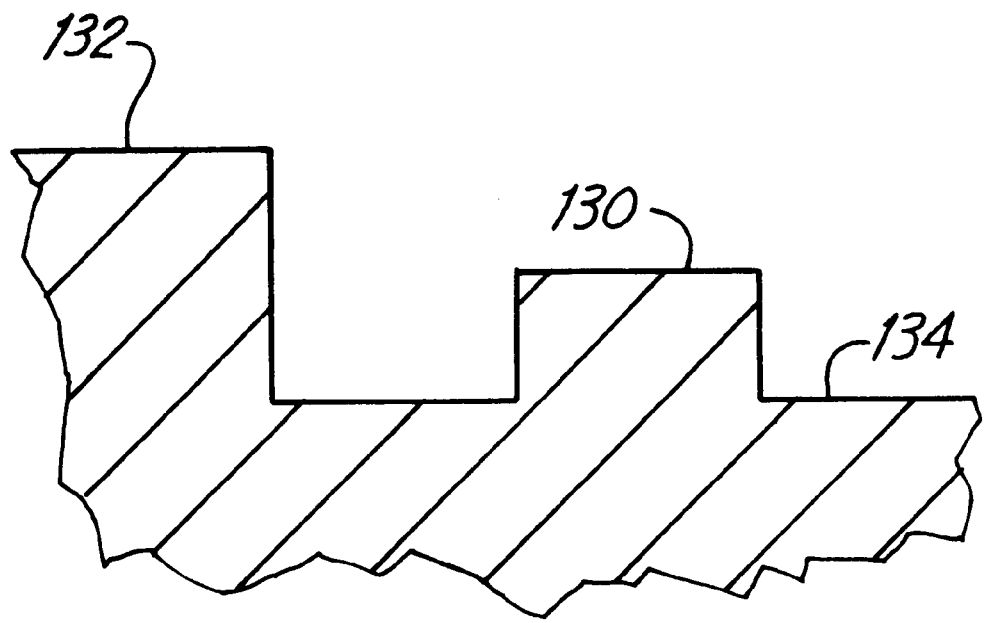
FIG. 12 is a fragmentary, sectional view of a raised surface feature formed on slider body according to the present invention.
Figure 13:
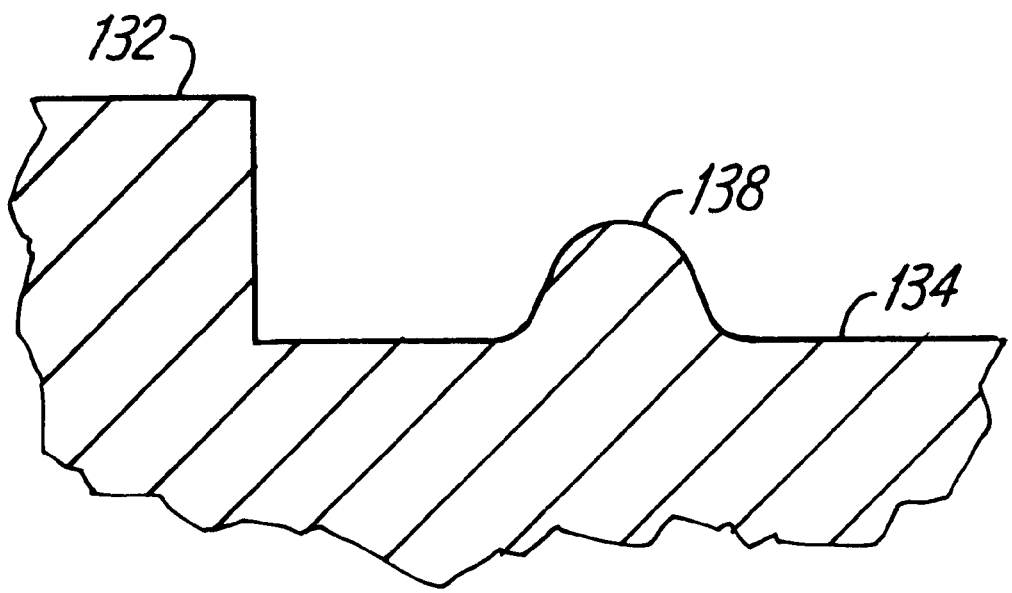
FIG. 13 is a fragmentary, sectional view of a raised surface feature having a more rounded cross section.

FIG. 12 is a fragmentary cross sectional view of a rectangular ridge 130 formed adjacent the trailing edge of a side rail 132 on slider body 134. Surface feature 130 is preferably raised from the body of slider and recessed from side rail 132. FIG. 13 is a fragmentary sectional view of a ridge 136 having a more rounded cross section. In one embodiment, ridge 136 has side walls 138 with a radius of curvature that is matched to the contact angle of the lubricant that is to be collected.

Although the present invention has been described with reference to preferred embodiments, workers skilled in the art will recognize that changes may be made in form and detail without departing from the spirit and scope of the invention.

What is claimed is:

1. A slider for supporting a transducer proximate to a lubricated recording medium, the slider comprising:
    a slider body;
    at least one raised rail which forms a bearing surface that defines a stagnant flow region along an edge of the rail; and
    surface feature means positioned on the slider body and confined to the stagnant flow region for decreasing the potential energy of lubrication collected on the slider body from the recording medium within the stagnant flow region and for inhibiting migration of the collected lubrication toward the raised rail.

2. A slider for supporting a transducer proximate to a lubricated recording medium, the slider comprising:
    a slider body having a leading edge, a trailing edge and an axis extending from the leading edge to the trailing edge;
    a fluid flow pattern across the slider body from the leading edge to the trailing edge;
    first and second elongated raised rails formed on the slider body and extending generally parallel to the axis wherein the first and second rails each have bearing surface edge that is angled with respect to the axis and defines a lubricant collection area which trails the bearing surface edge relative to the leading and trailing edges of the slider body and which has stagnant flow in the fluid flow pattern;
    first and second lubricant traps formed on the slider body and positioned within the lubricant collection areas of the first and second rails, respectively, to inhibit lubrication collected within the lubricant collection areas from migrating to the first and second rails; and
    a cavity dam extending between the first and second raised rails and defining a subambient pressure cavity on the slider body, wherein the bearing surface edges of the first and second rails and the first and second lubricant traps oppose one another across the subambient pressure cavity, and wherein slider body is flat in an area of the subambient pressure cavity between the first and second lubricant traps.

3. The slider of claim 1 wherein the first lubricant trap comprises a recess within the slider body.

4. The slider of claim 3 wherein the recess has a width of 0.1 to 10 microns and a depth of 0.1 to 10 microns.

5. The slider of claim 3 wherein the recess has a width of 1 to 2 microns and a depth of 1 to 2 microns.

6. The slider of claim 1 wherein the first lubricant trap comprises a trench formed in the slider body transverse to the axis.

7. The slider of claim 1 wherein the first lubricant trap comprises a plurality of parallel trenches formed in the slider body transverse to the axis and spaced from one another in a direction parallel to the axis.

8. The slider of claim 1 wherein the first lubricant trap comprises a plurality of trenches which are arranged to form a lattice.

9. The slider of claim 1 wherein the first lubricant trap comprises a plurality of spaced apart depressions.

10. The slider of claim 9 wherein the plurality of spaced apart depressions substantially surround the first rail.

11. The slider of claim 1 wherein the first lubricant trap comprises a rectangular trench.

12. The slider of claim 1 wherein the first lubricant trap comprises a curvilinear trench.

13. The slider of claim 1 wherein the first lubricant trap comprises a trench having an oblique side wall opposite to the first raised rail.

14. The slider of claim 1 wherein the first lubricant trap comprises a depression having a radius of curvature that is matched to the contact angle of the collected lubricant.

15. The slider of claim 1 wherein the first lubricant trap comprises a raised surface feature formed on the slider body.

16. The slider of claim 15 wherein the raised surface feature comprises an elongated ridge extending transverse to the axis.

17. The slider of claim 15 wherein the raised surface feature is raised from the slider body and recessed from the first raised rail.

18. The slider of claim 15 wherein the raised surface feature comprises a plurality of parallel, elongated ridges formed in the slider body transverse to the axis and spaced from one another in a direction parallel to the axis.

19. The slider of claim 15 wherein the raised surface feature comprises a plurality of raised surface features which substantially surround the first rail.

20. The slider of claim 15 wherein the raised surface feature comprises a plurality of ridges which are arranged to form a lattice.

21. The slider of claim 15 wherein the raised surface feature comprises a plurality of spaced apart bumps.

22. The slider of claim 15 wherein the raised surface feature has a radius of curvature that matches the contact angle of the collected lubricant.

23. The slider of claim 1 wherein the first and second rails extend between the leading edge and the trailing edge and each having an inner edge, an outer edge, a leading portion, a trailing portion and a waist portion which is narrower than the leading and trailing portions, wherein the bearing surface edges of the first and second rails that are angled with respect to the axis are defined along the inner edges of the first and second rails, respectively; and wherein the first and second lubricant traps are positioned on the slider body along the waist portions of the first and second rails, respectively.

24. The slider of claim 23 wherein a cross rail extends between the leading portions of the first and second rails.

25. The slider of claim 1 wherein the first and second rails extend from the leading edge toward the trailing edge and terminate prior to the trailing edge; and wherein the slider further comprises a third lubricant trap positioned between the trailing edge and the first rail and a fourth lubricant trap positioned between the trailing edge and the second rail.

26. A disc drive data storage system, comprising:

a housing;

a spindle motor attached to the housing;

at least one data storage disc attached to the spindle motor and having a recording surface with a lubrication layer;

an actuator assembly attached to the housing;

a disc head slider carried by the actuator proximate to the recording surface and comprising a slider body, first and second raised side rails, and first and second lubricant traps, wherein each of the first and second raised side rails has an edge that angles away from the other of the first and second raised side rails and defines a stagnant flow region forming a lubricant collection area on the slider body along the respective raised side rail, wherein the first and second lubricant traps are positioned on the slider body within the lubricant collection areas along the first and second raised side rails, respectively, and the slider body is flat between the first and second traps; and a transducer carried by the disc head slider.

27. A slider for supporting a transducer proximate to a lubricated recording medium, the slider comprising:

a slider body having a leading edge, a trailing edge and an axis extending from the leading edge to the trailing edge;

a fluid flow pattern across the slider body from the leading edge to the trailing edge, having at least one stagnant flow region;

at least one raised rail formed on the slider body; and a surface discontinuity formed on the slider body and positioned within the stagnant flow region to inhibit lubrication collected within the stagnant flow region from migrating to the rail, wherein the surface discontinuity comprises a plurality of trenches which are arranged to form a lattice.

28. A slider for supporting a transducer proximate to a lubricated recording medium, the slider comprising:

a slider body having a leading edge, a trailing edge and an axis extending from the leading edge to the trailing edge;

a fluid flow pattern across the slider body from the leading edge to the trailing edge, having at least one stagnant flow region;

at least one raised rail formed on the slider body; and a surface discontinuity formed on the slider body and positioned within the stagnant flow region to inhibit lubrication collected within the stagnant flow region from migrating to the rail, wherein the surface discontinuity comprises a depression having a radius of curvature that is matched to the contact angle of the collected lubricant.

29. A slider for supporting a transducer proximate to a lubricated recording medium, the slider comprising:

a slider body having a leading edge, a trailing edge and an axis extending from the leading edge to the trailing edge;

a fluid flow pattern across the slider body from the leading edge to the trailing edge;

first and second elongated raised rails, formed on the slider body and extending generally parallel to the axis, wherein the first and second rails each have a bearing surface edge that is angled with respect to the axis and defines a lubricant collection area, which trails the bearing surface edge relative to the leading and trailing edges of the slider body and which has stagnant flow in the fluid flow pattern, and wherein the first and second rails extend from the leading edge toward the trailing edge and terminate prior to the trailing edge; and first and second lubricant traps formed on the slider body and positioned within the lubricant collection areas of the first and second rails, respectively, to inhibit lubrication collected within the lubricant collection areas from migrating to the first and second rails, wherein the first lubricant trap is positioned between the trailing edge and the first rail and the second lubricant trap is positioned between the trailing edge and the second rail.

* * * * *

UNITED STATES PATENT AND TRADEMARK OFFICE
CERTIFICATE OF CORRECTION

PATENT NO. : 6,055,127
DATED : April 25, 2000
INVENTOR(S) : Zine-Eddine Boutaghou et al.

It is certified that error appears in the above-identified patent and that said Letters Patent is hereby corrected as shown below:

Col. 5, line 66, after "raised rails", insert --,--.

Col. 5, line 67, after "axis", insert --,--.

Col. 6, line 1, after "have", insert --a--.

Col. 6, line 17, after "wherein", insert --the--.

Signed and Sealed this

Twentieth Day of March, 2001

Attest:

NICHOLAS P. GODICI

*Attesting Officer*   *Acting Director of the United States Patent and Trademark Office*